United States Patent
Axnix et al.

(10) Patent No.: US 9,772,954 B2
(45) Date of Patent: *Sep. 26, 2017

(54) PROTECTING CONTENTS OF STORAGE

(71) Applicant: INTERNATIONAL BUSINESS MACHINES CORPORATION, Armonk, NY (US)

(72) Inventors: Christine Axnix, Dettenhausen (DE); Ute Gaertner, Schoenaich (DE); Jakob C. Lang, Altdorf (DE); Angel Nunez Mencias, Stuttgart (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/941,549

(22) Filed: Nov. 14, 2015

(65) Prior Publication Data

US 2016/0292087 A1 Oct. 6, 2016

Related U.S. Application Data

(63) Continuation of application No. 14/676,866, filed on Apr. 2, 2015.

(51) Int. Cl.
*G06F 12/14* (2006.01)
*H04L 29/06* (2006.01)
(Continued)

(52) U.S. Cl.
CPC ........ *G06F 12/1408* (2013.01); *G06F 12/084* (2013.01); *G06F 12/0862* (2013.01);
(Continued)

(58) Field of Classification Search
CPC ....................................................... G06F 21/10
See application file for complete search history.

(56) References Cited

U.S. PATENT DOCUMENTS 8,010,763 B2    8/2011    Armstrong et al.
8,275,996 B1    9/2012    Melvin
(Continued)

FOREIGN PATENT DOCUMENTS

EP    1612671 B1    1/2009

OTHER PUBLICATIONS

Chhabra, Siddhartha et al., "i-NVMM: A Secure Non-Volatile Main Memory System with Incremental Encryption," Jun. 2011, pp. 177-188.
(Continued)

*Primary Examiner* — Kambiz Zand
*Assistant Examiner* — Thanh Le
(74) *Attorney, Agent, or Firm* — William A. Kinnaman, Jr., Esq.; Blanche E. Schiller, Esq.; Heslin Rothenberg Farley & Mesiti P.C.

(57) ABSTRACT

Protecting contents of storage in a computer system from unauthorized access. The computer system comprises one or more processing units sharing the storage, the processing units each having at least one processor cache. Each processing unit respectively encrypts or decrypts, with a protected section key in the chip cache, data transferred between its processor cache and the protected section, and each processing unit respectively encrypts or decrypts, with a segment key, data transferred between the chip cache and the storage, when data relates to a specific segment of the storage.

15 Claims, 3 Drawing Sheets

(51) Int. Cl.
*G06F 12/0862* (2016.01)
*G06F 12/084* (2016.01)
*H04L 9/06* (2006.01)
*H04L 9/08* (2006.01)
*G06F 21/57* (2013.01)
*G06F 9/44* (2006.01)

(52) U.S. Cl.
CPC .......... *G06F 21/575* (2013.01); *H04L 9/0662* (2013.01); *H04L 9/0869* (2013.01); *H04L 63/061* (2013.01); *G06F 9/4403* (2013.01); *G06F 2212/1052* (2013.01); *G06F 2212/314* (2013.01); *G06F 2212/6026* (2013.01)

(56) References Cited

U.S. PATENT DOCUMENTS

| | | | |
|---|---|---|---|
| 8,516,271 B2 | 8/2013 | Faraboschi et al. | |
| 8,627,112 B2 | 1/2014 | Chaturvedi et al. | |
| 8,656,189 B2 | 2/2014 | Orsini et al. | |
| 8,738,932 B2* | 5/2014 | Lee | G06F 21/72 713/164 |
| 2003/0118189 A1* | 6/2003 | Ibi | H04L 9/0822 380/277 |
| 2006/0294288 A1* | 12/2006 | Seth | G06F 12/145 711/6 |
| 2011/0293097 A1* | 12/2011 | Maino | G06F 12/0811 380/279 |
| 2012/0328105 A1 | 12/2012 | Mukkara et al. | |
| 2014/0081918 A1* | 3/2014 | Srivas | G06F 17/3007 707/639 |

OTHER PUBLICATIONS

Hong, Mei et al., "Dynamic Encryption Key Design and Management for Memory Data Encryption in Embedded Systems," Aug. 2013, pp. 70-75.
"Cold Boot Attack," http://en.wikipedia.org/wiki/Cold_boot_attack; (downloaded from internet Mar. 10, 2015), pp. 1-5.
Axnix, Christine et al., "Protecting Storage From Unauthorized Access," U.S. Appl. No. 14/676,859, filed Apr. 2, 2015, pp. 1-30.
Axnix, Christine et al., "Protecting Storage From Unauthorized Access," U.S. Appl. No. 14/941,548, filed Nov. 14, 2015, pp. 1-24.
Axnix, Christine et al., "Protecting Contents of Storage," U.S. Appl. No. 14/676,866, filed Apr. 2, 2015, pp. 1-29.
List of IBM Patents or Patent Applications Treated as Related, Mar. 17, 2016, pp. 1-2.
Office Action for U.S. Appl. No. 14/676,859 dated Nov. 2, 2016, pp. 1-21.
Office Action for U.S. Appl. No. 14/941,548 dated Nov. 3, 2016, pp. 1-20.
Office Action for U.S. Appl. No. 14/676,866 dated Dec. 7, 2016, pp. 1-17.
Office Action for U.S. Appl. No. 14/676,859 dated Mar. 8, 2017, pp. 1-10.
Office Action for U.S. Appl. No. 14/941,548 dated Mar. 8, 2017, pp. 1-10.
Notice of Allowance for U.S. Appl. No. 14/676,866 dated Mar. 21, 2017, pp. 1-23.

* cited by examiner

PROTECTING CONTENTS OF STORAGE

This application is a continuation of co-pending U.S. patent application Ser. No. 14/676,866, filed Apr. 2, 2015, entitled "Protecting Contents of Storage," which is hereby incorporated herein by reference in its entirety.

BACKGROUND

One or more aspects relate in general to data processing systems, and in particular, to protecting contents of storage in a computer system from unauthorized access.

In cryptography, a cold boot attack, or to a lesser extent, a platform reset attack is a type of side channel attack in which an attacker with physical access to a computer is able to retrieve valuable data, such as encryption keys, from a running operating system after using a cold reboot to restart the machine. The attack relies on the data remanence property of DRAM (dynamic random access memory) and SRAM (static random access memory) to retrieve memory contents that remain readable in the seconds to minutes after power has been removed.

To execute the attack, a running computer is cold-booted. Cold-booting refers to when power is cycled "off" and then "on" without letting the operating system shut down cleanly, or, if available, pressing the "reset" button. A removable disk with a special boot sector might then be immediately booted (e.g., from a USB (universal serial bus) flash drive), and used to dump the contents of pre-boot memory to a file. Alternatively, the memory modules are removed from the original system and quickly placed in a compatible machine under the attacker's control, which is then booted to access the memory. Further analysis can then be performed against the information that was dumped from memory to find various sensitive data, such as the keys contained in it. Automated tools are now available to perform this task for attacks against some popular encryption systems.

Such an attack is a hardware (insecure memory) and not a software issue. Any sensitive data held in memory is vulnerable to the attack.

Other attacks allow encryption keys to be read from memory. For example, a DMA (direct memory access) attack allows physical memory to be accessed via a 1394 DMA channel.

The ability to execute the cold boot attack successfully varies considerably across different systems, types of memory, memory manufacturers and motherboard properties.

SUMMARY

A method is provided for protecting contents of storage in a computer system from unauthorized access. The method includes one or more processing units sharing the storage. Each processing unit has at least one processor cache. A hypervisor is executed by the computer system. The method includes, for instance: assigning an area of the storage to a protected section; and one of the processing units generating a random protected section key and distributing the protected section key to the other processing units, wherein storing the protected section key in the at least one chip cache, before starting execution of the hypervisor. Further, the method includes each processing unit respectively encrypting or decrypting, with the protected section key in the chip cache, data transferred between the chip cache and the storage, when the data relates to the protected section used by the hypervisor, by encrypting the data on or before leaving the chip cache and decrypting the data on or after receiving in the chip cache; and assigning the remaining areas of the storage, which are not assigned to the protected section, to segments of equal size each. Then, for each segment, generating a corresponding random segment key and storing it in the protected section. The method further includes each processing unit respectively encrypting or decrypting, with the corresponding segment key, data transferred between the chip cache and the storage, when data relates to a specific segment, by encrypting the data on or before leaving the chip cache and decrypting the data on or after receiving in the chip cache.

Thus, data never leaves the secure area of the processing units with its processor caches and corresponding chip caches unencrypted when transferred outside to other caches or to the storage.

Computer program products and systems relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects of the present invention together with the above-mentioned and other objects and advantages may best be understood from the following detailed description of the embodiments, but not restricted to the embodiments, wherein is shown in.

DETAILED DESCRIPTION

Figure 1:
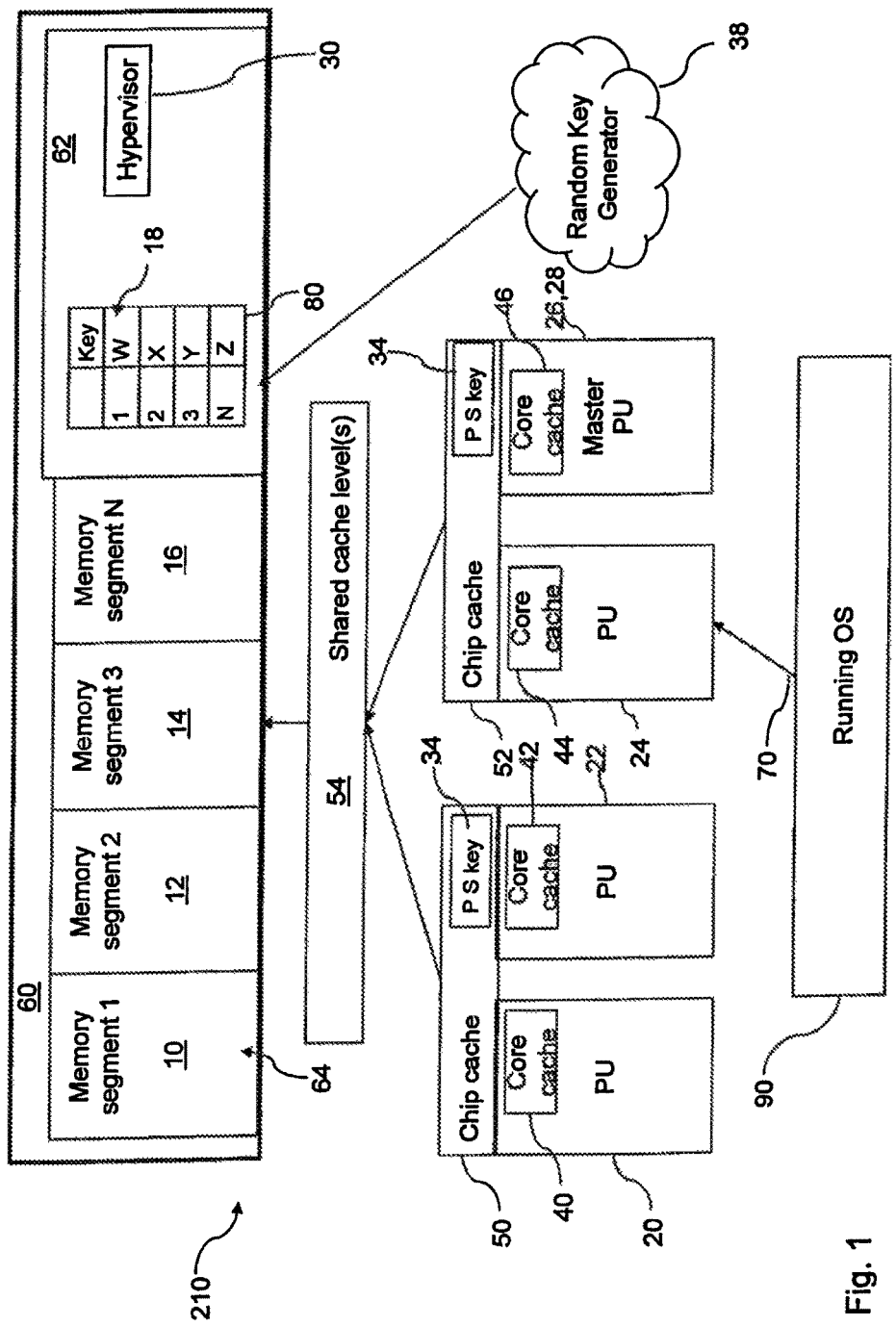
FIG. 1 one example of a system diagram of an environment in which one or more aspects according to an embodiment of the invention is implemented.

In the drawings, like elements are referred to with equal reference numerals. The drawings are merely schematic representations, not intended to portray specific parameters of aspects of the invention. Moreover, the drawings are intended to depict only typical embodiments of aspects of the invention, and therefore, should not be considered as limiting the scope of aspects of the invention.

One or more of the illustrative embodiments described herein provide a method, system, and computer program product for sharing memory between guests. One or more embodiments are sometimes described herein using particular technologies only as an example for the clarity of the description. One or more embodiments may be used for sharing memory between a first guest and a second guest, the first guest running a first operating system and the second guest running a second operating system, where the two operating systems could be the same one, but could also be different operating systems.

Cold boot attack and system administrator intrusion are threats in the data processing sector. Especially in outsourcing environments the customer has to trust the provider. One or more aspects offer a solution to the cold boot attack and prevention for the memory of multi-tenant ready administrator intrusion.

According to an embodiment of the invention, the memory of a hypervisor and its virtual machines is encrypted in the memory chips so that encryption is transparent to the operating systems and the data never leaves a processing unit unencrypted. One or more aspects use different encryption keys for the hypervisor and its virtual machines so that knowing the data (on the clear and encrypted) of an operating system does not enable to decrypt the encrypted data of another operating system, which may be e.g. a multi-tenant system.

FIG. 1 depicts one example of a system diagram of an environment in which one or more aspects according to an embodiment of the invention is implemented. The system 210 is running an operating system 90 and includes a number of processor units (PU) 20, 22, 24, 26. The processor units 20, 22, 24, 26 are equipped with processor caches 40, 42, 44, 46, named core caches in FIG. 1, respectively, which may be realized with one or more cache levels. Chip caches 50, 52 are next higher cache levels, each serving two processor units 20, 22, and 24, 26, respectively. The next higher cache level 54 may be a real memory for different processor units 20, 22, 24, 26. A hypervisor 30 is being executed by the computer system 210 in a protected section area 62. The operating system 90 is configured to perform memory accesses 70 via the processor units 20, 22, 24, 26. The processor units 20, 22, 24, 26 are sharing the storage 60. The storage 60 is, besides the protected section 62, assigned to segments 10, 12, 14, 16 of equal size each, where user data may be stored for usage of the processing units 20, 22, 24, 26.

According to one or more aspects of protecting contents of the storage 60 in the computer system 210 from unauthorized access, an area of the storage 60 is assigned to a protected section 62. Then, one of the processing units 20, 22, 24, 26 generates a random protected section key 34, and distributes the protected section key 34 to the other processing units 20, 22, 24, 26. The protected section key 34 is stored in the at least one chip cache 50, 52, before starting execution of the hypervisor 30. Further, each processing unit 20, 22, 24, 26 respectively encrypts or decrypts, with the protected section key 34 in the chip cache 50, 52, data transferred between the chip cache 50, 52 and the storage 60, when data relates to the protected section 62 used by the hypervisor 30, by encrypting the data on or before leaving the chip cache 50, 52 and decrypting the data on or after receiving in the chip cache 50, 52. Then, the remaining areas of the storage 60, which are not assigned to the protected section 62, are assigned to segments 10, 12, 14, 16 of equal size each. Further, for each segment 10, 12, 14, 16 a corresponding random segment key 18 is generated and stored in the protected section 62. Further, each processing unit 20, 22, 24, 26 respectively encrypts or decrypts, with the corresponding segment key 18, data transferred between the chip cache 50, 52 and the storage 60, when data relates to a specific segment 10, 12, 14, 16, by encrypting the data on or before leaving the chip cache 50, 52 and decrypting the data on or after receiving in the chip cache 50, 52.

The storage 60 may be a main memory of the computer system 210; it could also be a disk drive or any other storage device.

In the embodiment shown in FIG. 1, the computer system 210 comprises the processing units 20, 22, 24, 26 sharing the processor cache 54 for accessing the storage 60. The processing units 20, 22, 24, 26 each have a processor cache 40, 42, 44, 46 connected to the shared processor cache 54 via the chip caches 50, 52, respectively. Data is in clear mode while being in the processor cache 40, 42, 44, 46 and in the chip cache 50, 52. Thus, each processing unit 20, 22, 24, 26 is respectively encrypting or decrypting, with the protected section key 34, data transferred between the chip cache 50, 52 and the shared cache 54, when it relates to the protected section 62 used by the hypervisor 30, by encrypting the data on or before leaving the chip cache 50, 52 and decrypting the data on or after receiving in the chip cache 50, 52. Each processing unit 20, 22, 24, 26 is respectively encrypting or decrypting, with the corresponding segment key 18, data transferred between the chip cache 50, 52 and the shared cache 54, when data relates to a specific segment 10, 12, 14, 16, by encrypting the data on or before leaving the chip cache 50, 52 and decrypting the data on or after receiving in the chip cache 50, 52. A random key generator 38 is used for creating the protected section key 34 as well as the segment keys 18.

Thus, data never leaves the secure area of the processing units 20, 22, 24, 26 with its processor caches 40, 42, 44, 46 and chip caches 50, 52 unencrypted when transferred outside to other caches, as e.g. shared caches 54 or to the storage 60.

A protected section key 34 may be generated and stored in the computer system 210, by starting a boot process on one of the processing units 20, 22, 24, 26 as a master processing unit 28. The protected section key 34 for this master processing unit 28 is then generated using a random key generator 38. The master processing unit 28 distributes the protected section key 34 to all other processing units 20, 22, 24, 26 of the computer system 210. Thus, a processing unit 20, 22, 24, 26 may be booting the hypervisor 30 by accessing the protected section 62 using the protected section key 34. The segment key 18 may be stored in a segment key table 80 in the protected section 62.

In one or more aspects, existing operating systems and applications do not need to be modified, because one or more aspects are based on the use of two different kinds of keys. Only hardware and firmware of the computer systems are to be adapted. The data from the protected section 62 is encrypted by one single protected section key 34, whereas the data resident in the memory segments 10, 12, 14, 16 is encrypted by a segment key 18 which is generated for each specific segment uniquely. Data from a segment 10 is known only to the segment 10 and not to other segments 12, 14, 16.

The data is in clear mode when used in the processing units 20, 22, 24, 26. The data is also in clear mode in the processor caches 40, 42, 44, 46, which may be caches of first and second level, as well as in the chip caches 50, 52. The chip caches 50, 52 possess the protected section key 34 in order to be able to access the segment keys 18. Data to be transferred to the storage 60 may thus be encrypted with the segment key 18, which may also be the case for the shared cache 54.

Data in a shared cache 54 or a segment 10, 12, 14, 16 may be encrypted/decrypted in the computer system 210, by looking up the corresponding segment key 18 in the segment key table 80 in the protected section 62 and loading the segment key 18 into the chip cache 50, 52.

When stored in the storage 60, whether in the protected section 62 of the hypervisor 30 or in the memory area 64 of a segment 10, 12, 14, 16, the data is encrypted with the corresponding protected section key 34 or the segment key 18, respectively.

The protected section 62 is a firmware owned memory. The firmware of the computer system 210 may directly access data of the storage 60, because the firmware can access all the keys 18, 34 in the protected section 62, but no customer and no processing unit 20, 22, 24, 26. Similarly the firmware may also access the processor caches 40, 42, 44, 46 or the chip caches 50, 52. Thus, only the firmware may know that data is encrypted, whereas the operating system 90 does not have any knowledge of the encryption method.

Data may be stored unencrypted in a processor cache 40, 42, 44, 46 or a chip cache 50, 52. A processing unit 20, 22, 24, 26 may thus access data from the storage 60 or a shared cache 54 by fetching the data from the storage 60 or the shared cache 54, respectively, fetching the segment key 18 by the chip cache 50, 52, and decrypting the data using the segment key 18 and storing the data in a processor cache 40, 42, 44, 46 or a chip cache 50, 52.

A processing unit 20, 22, 24, 26 may store data to the storage 60 or a shared cache 54 by fetching the corresponding segment key 18 by the chip cache 50, 52, encrypting the data using the segment key 18 from the protected section 62 and writing the encrypted data to the storage 60 or the shared cache 54, respectively.

A processing unit 20, 22, 24, 26 may thus access data in the protected section 62 by using the protected section key 34 in the chip cache 50, 52 to encrypt/decrypt the data.

The computer system 210, when executing firmware code, may therefore use the protected section key 34 for accessing the protected section 62. The hypervisor 30 may access a segment 10, 12, 14, 16 of the storage 60 by using the segment key 18 from the segment key table 80. The segment key 18 may be provided by adding a segment size offset to a start pointer and fetching the segment key 18 from the segment key table 80. An offset may be calculated by an accessed address divided by a segment size, and multiplied by a size of the segment key 18.

Figure 2:
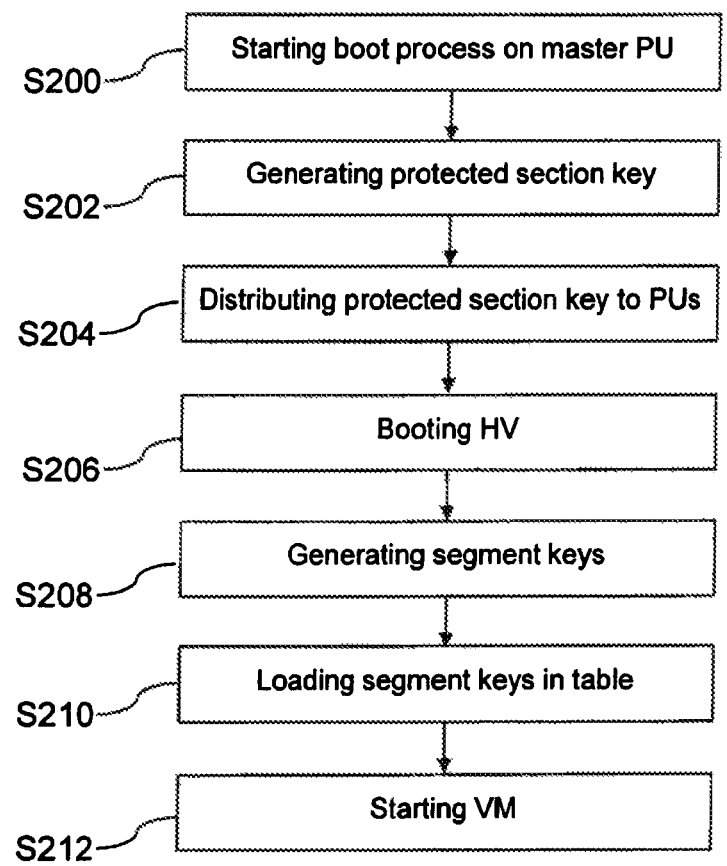
FIG. 2 a flowchart of one example of protecting contents of storage in a computer system from unauthorized access according to an embodiment of the invention.

FIG. 2 shows a flowchart of one example of protecting contents of storage in a computer system 210 from unauthorized access according to an embodiment of the invention.

One or more aspects use two types of encryption keys: segment keys (per memory segment), and a protected section key. In FIG. 2 it is depicted how the keys are created and stored in the computer system. First, in step S200 a boot process is started on one processing unit which will serve as a master processing unit. Next in step S202 the firmware creates the protected section key for this master PU using a random key generator. In step S204 the master PU distributes the protected section key to all other PUs in the computer system for storing it in the corresponding chip caches. Using this protected section key, the PUs can all access the protected section and boot the hypervisor in step S206. Before a virtual machine is started, segment keys are generated in step S208 (per memory segment), and stored in a segment key table in the protected section (memory segment identification, segment key) in step S210. For every new segment activation, a new segment key may be created. The segment key may then be used by the processing units when accessing data in the storage before or during starting/dispatching a virtual machine in step S212.

Thus, there is no need to make segment keys visible or controllable by a customer. The operating system in a virtual machine uses clear data and can encrypt its dumps or IO (input/output) data itself.

When OS/application code is running, the virtual machines may access the storage, e.g. the main memory. If data is in the processor cache or a chip cache of a PU, it is unencrypted and can be directly read. If data is in the shared cache, or memory, the corresponding segment key is used for memory access. The corresponding PU fetches encrypted data from the shared cache, or memory. Data is decrypted using the segment key, and placed in the processor cache or the chip cache. For stores, when data leaves the processor cache or the chip cache to the shared cache, or the memory, data is encrypted using the segment key before writing it to the shared cache or memory. Thus, there is no need during the next dispatch of a VM with a different VM ID on the same PU, that the hypervisor ensures that processor cache data is encrypted with the previous VM key and written to the chip cache or shared cache or memory, before the new VM key is loaded.

When hypervisor code is executed, the firmware uses the protected section key for fetch and hypervisor data area access. If the hypervisor is to access the VM's storage, the corresponding segment key from the segment key table may be used to access the data in a segment of the storage.

Dependent on the implementation of IO accesses to the storage, i.e. if they go to (unencrypted) chip cache or to (encrypted) shared cache or directly to (encrypted) memory, the IO process may use a protected section key and/or a segment key.

Shared segments between different virtual machines are transparent and do not need special handling.

Thus, data processing is configured in, e.g., three steps. First, in the activation phase, the virtual machines are activated. A processing unit loads a virtual machine, knowing where in the protected section to locate a segment key which is used to decrypt the corresponding data. Therefore, the processing unit only needs the protected section key. In the execution phase, the processing unit decrypts data transferred from the storage or otherwise; if data is to be transferred to the storage, data is encrypted. In the switching phase, if the processing unit is to be dedicated to another virtual machine, the remaining data does not need to be restored in the segment, before the new virtual machine may be dispatched, because only, in one embodiment, the protected section key is available in the processing unit or the chip cache.

Figure 3:
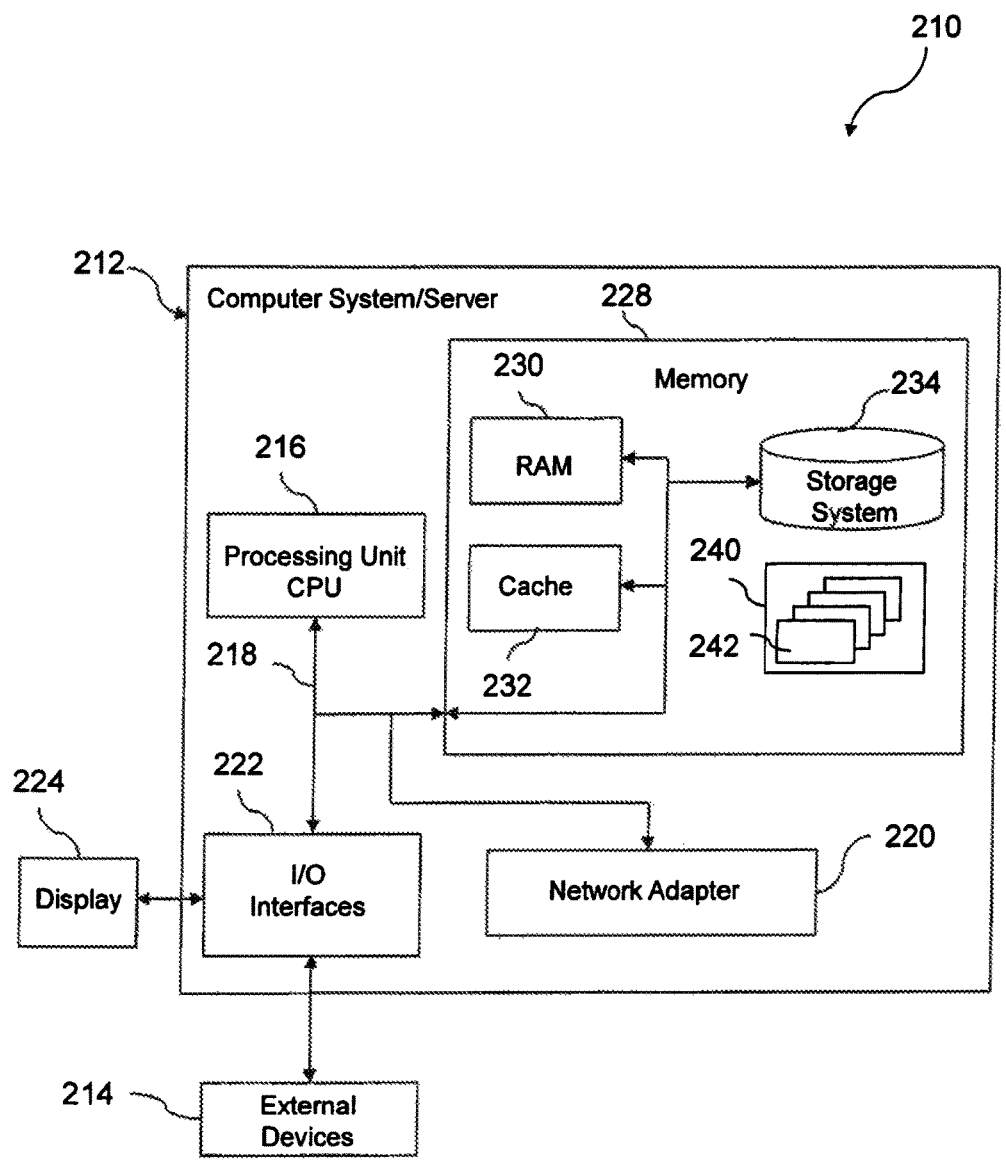
FIG. 3 an example embodiment of a data processing system for executing a method according to one or more aspects of the invention.

Referring now to FIG. 3, a schematic of an example of a data processing system 210 is shown. Data processing system 210 is only one example of a suitable data processing system and is not intended to suggest any limitation as to the scope of use or functionality of embodiments of the invention described herein. Regardless, data processing system 210 is capable of being implemented and/or performing any of the functionality set forth herein above.

In data processing system 210, there is a computer system/server 212, which is operational with numerous other general purpose or special purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein.

Computer system/server 212 may also communicate with one or more external devices 214, such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

One or more aspects of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of aspects of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of protecting contents of storage in a computer system from unauthorized access, the computer system comprising a plurality of processing units sharing the storage, each processing unit having at least one processor cache and at least one chip cache, wherein a hypervisor is executed by the computer system, the method comprising:
    assigning an area of the storage to a protected section;
    generating, by one processing unit of the plurality of processing units, a protected section key, the protected section key being a random protected section key, and distributing by the one processing unit the protected section key to other processing units of the plurality of processing units, wherein the protected section key is stored in the at least one chip cache, before starting execution of the hypervisor;
    encrypting or decrypting, by each processing unit respectively, with the protected section key in the at least one chip cache, data transferred between a chip cache and the storage, when the data relates to the protected section used by the hypervisor, by encrypting the data on or before leaving the chip cache and decrypting the data on or after receiving the data in the chip cache;
    assigning remaining areas of the storage, which are not assigned to the protected section, to memory segments of equal size each;
    generating, for each memory segment, a corresponding random segment key and storing it in the protected section; and
    encrypting or decrypting, by each processing unit respectively, with the corresponding random segment key stored in the protected section, data transferred between the chip cache and the storage, when data relates to a specific memory segment, by encrypting the data on or before leaving the chip cache and decrypting the data on or after receiving the data in the chip cache.

2. The method according to claim 1, further comprising:
    encrypting or decrypting, by each processing unit respectively, with the protected section key in the chip cache, data transferred between the chip cache and the shared cache, when it relates to the protected section, by encrypting the data on or before leaving the chip cache and decrypting the data on or after receiving the data in the chip cache; and
    encrypting or decrypting, by each processing unit respectively, with the corresponding random segment key, data transferred between the chip cache and the shared cache, when data relates to a specific memory segment, by encrypting the data on or before leaving the chip cache and decrypting the data on or after receiving the data in the chip cache.

3. The method according to claim 1, wherein the storage is a main memory of the computer system.

4. The method according to claim 1, further comprising:
starting a boot process on one processing unit of the plurality of processing units as a master processing unit;
generating the protected section key for this master processing unit using a random key generator; and
distributing, by the master processing unit, the protected section key to other processing units of the computer system.

5. The method according to claim 4, further comprising booting the hypervisor by accessing the protected section using the protected section key.

6. The method according to claim 1, further comprising:
generating the corresponding random segment key using a random key generator; and
storing the corresponding random segment key in a segment key table in the protected section.

7. The method according to claim 6, further comprising:
looking up the corresponding random segment key in the segment key table in the protected section; and
loading the corresponding random segment key into the chip cache.

8. The method according to claim 1, further comprising storing data unencrypted in a processor cache or the chip cache.

9. The method according to claim 1, further comprising accessing, by a processing unit, data from the storage or a shared cache by:
fetching the data from the storage or the shared cache, respectively;
fetching the corresponding random segment key by the chip cache; and
decrypting the data using the corresponding random segment key.

10. The method according to claim 1, further comprising storing data, by a processing unit, to the storage or a shared cache by:
fetching the corresponding segment key by the chip cache;
encrypting the data using the corresponding segment key; and
writing the encrypted data to the storage or the shared cache, respectively.

11. The method according to claim 1, further comprising accessing, by the processing unit, data in the protected section by using the protected section key in the chip cache to encrypt or decrypt the data.

12. The method according to claim 1, further comprising using, by the computer system, when executing firmware code, the protected section key for accessing the protected section.

13. The method according to claim 1, further comprising accessing, by the hypervisor, a memory segment by using the corresponding random segment key from a segment key table.

14. The method according to claim 1, further comprising providing, by the chip cache, the corresponding random segment key by adding a segment size offset to a start pointer and fetching the corresponding random segment key from a segment key table.

15. The method according to claim 14, further comprising calculating the segment size offset by dividing an accessed address by a segment size, and multiplying by a size of the corresponding random segment key.

* * * * *